United States Patent
Chatterjee et al.

(10) Patent No.: US 8,527,333 B1
(45) Date of Patent: Sep. 3, 2013

(54) SYSTEM AND METHOD OF SELECTING ADVERTISING

(75) Inventors: Surojit Chatterjee, Fremont, CA (US); Douglas T. Hudson, Bayville, NJ (US)

(73) Assignee: Google Inc., Mountain View, CA (US)

( * ) Notice: Subject to any disclaimer, the term of this patent is extended or adjusted under 35 U.S.C. 154(b) by 324 days.

(21) Appl. No.: 12/886,858

(22) Filed: Sep. 21, 2010

Related U.S. Application Data

(60) Provisional application No. 61/244,241, filed on Sep. 21, 2009.

(51) Int. Cl.
*G06Q 30/00* (2006.01)

(52) U.S. Cl.
USPC ........................................ 705/14.1

(58) Field of Classification Search
USPC ........................................ 705/14.1
See application file for complete search history.

(56) References Cited

U.S. PATENT DOCUMENTS

| | | | | |
|---|---|---|---|---|
| 2002/0099605 | A1* | 7/2002 | Weitzman et al. | 705/14 |
| 2005/0144068 | A1 | 6/2005 | Calabria et al. | |

FOREIGN PATENT DOCUMENTS

WO 2008/119049 A2 10/2008

OTHER PUBLICATIONS

"A Futures Market for Online Ads" [online]. [Retrieved Sep. 22, 2010]. Retrieved from the internet: <http://www.fastcompany.com/node/1689435/print>.

* cited by examiner

*Primary Examiner* — Daniel Lastra
(74) *Attorney, Agent, or Firm* — Leason Ellis LLP

(57) ABSTRACT

A system and method is provided that uses a processor to rank advertisements based on their likely appeal to users and the price that will be charged for the advertisement. In one aspect, and advertiser may pay a fee in order to have its advertisement considered to be the most expensive in terms of price even though the advertiser is actually paying less. The fee may also be paid in connection with a transferable option, whereby the advertiser may have the right but not the obligation to have it advertisement displayed at the price.

48 Claims, 19 Drawing Sheets

300 www.a.com/adinput

310 — Enter information relating to your advertisement below.

320 — Keyword: Resolution
321 — User Name: X Gym
322 — Advertisement ID: X
323 — Maximum price-per-click: $0.25
324 — Starting Date: January 1, 2010
325 — Ending Date: January 7, 2010
326 — Advertising Content: A great gym at a great price.
327 — Advertisement Landing Page: www.x.com
328 — Highest Bidder Fee: $10.00

330 — Submit

332 — The current date is August 1, 2009

FIGURE 3

[ www.a.com/adinput ]

Enter information relating to your advertisement below.

410

420 — Keyword: Resolution
User Name: Y Street Cameras
Advertisement ID: Y
Maximum price-per-click: $0.30
424 — Starting Date: January 1, 2010
425 — Ending Date: January 3, 2010
We sell cameras with the highest resolution. — Advertising Content
Advertisement Landing Page: www.y.com
428 — Highest Bidder Fee Submit

*The current date is October 1, 2009*

FIGURE 4 www.a.com/adinput

Enter information relating to your advertisement below.

| | |
|---|---|
| Resolution | Keyword |
| Z's Diet Center | User Name |
| Z | Advertisement ID |
| $0.22 | Maximum price-per-click |
| January 3, 2010 | Starting Date |
| February 3, 2010 | Ending Date |
| We can help you eat better! | Advertising Content |
| www.z.com | Advertisement Landing Page |
| [////////] | Highest Bidder Fee |

( Submit )

The current date is November 1, 2009

FIGURE 5

```
┌─────────────────────────────────────────────────────────────┐
│ ⇧⇩  │ ⟲ www.a.com/sale?resolution&010610+6&ZDietCenter    │ │
├─────────────────────────────────────────────────────────────┤
│                                                             │
│ Enter the name of the user to whom are you selling your highest-bidder status, and the │
│ price of the sale below.                                    │
│                                                             │
│              Keyword:  Resolution                           │
│                Dates:  January 11-13, 2010                  │
│    Seller's User Name: X Gym                                │
│       Seller's Ad ID:  X                                    │
│   Highest Bidder Fee:  $12.50 (paid; non-refundable)        │
│      Price-Per-Click:  $0.30                                │
│   Buyer's User Name:   [ Z's Diet Center          ]         │
│  Buyer's Landing Page: [ www.z.com                ]         │
│          Sale Price:   [ $15.00                   ]         │
│                                                             │
│   ( Confirm )                                               │
│                                           The current date is December 15, 2009 │
└─────────────────────────────────────────────────────────────┘

1710 — browser bar
1720 — info section
1730 — Buyer's User Name
1740 — Buyer's Landing Page
1750 — Sale Price

FIGURE 17
```

existing code here …

SYSTEM AND METHOD OF SELECTING ADVERTISING

CROSS-REFERENCE TO RELATED APPLICATIONS

This application claims the benefit of the filing date of U.S. Provisional Patent Application No. 61/244,241 filed Sep. 21, 2009, the disclosure of which is hereby incorporated herein by reference.

BACKGROUND OF THE INVENTION

Google offers a variety of services related to searching and advertising. For example, a user may enter a search term on a web page offered by the service, and the service returns a webpage containing matching results.

The service may also display advertisements based on the search term. For example, users of Google's AdWords service may indicate an interest in having their advertisement displayed each time a user enters a particular search. These same advertisers may agree to pay a fee each time a user clicks on the search. Advertisers may limit the advertisement to certain time periods.

More than one advertiser may be interested a particular search term. Accordingly, Google uses a variety of data and techniques to determine which advertisement should be displayed and its placement of the webpage. These techniques include ranking advertisements based on the popularity of the advertiser's website and the prominence of the keyword on the advertiser's site.

BRIEF SUMMARY OF THE INVENTION

In one aspect, a method of displaying information to users is provided. A bid from each bidder among a plurality of bidders is received via a network, where a bid includes content (such as an advertisement) to be displayed to a user, a price to be paid by the bidder when the content is accepted by a user, and a search term. A bid among the plurality of the bids is then designated. A request for information from a user and a search term is also received over the network. A processor then selects a bid based on a comparison of the request's search term with the bid's search term, and further based on a quality component and a price component. The quality component is based on an estimate of the user's interest in the bid's content. The price component of an undesignated bid is based on that bid's price, but the price component of the designated bid is based on the highest price among the plurality of bids. The selected bid's content is then displayed on an electronic display to a user.

In another aspect, another method of displaying information to users is provided, which includes: receiving, from a first user, an identification of a first keyword/period pair, where a keyword/period pair comprises an association between a search term and a time range; receiving, from the first user, first content associated with the search term of the first keyword/period pair and a first price to be paid if the content is selected by another user when displayed to the user; receiving, from a second user, an identification of a second keyword/period pair, where the search term of the second keyword/period pair corresponds with the search term of the first keyword/period pair, and where the time range of the second keyword/period pair overlaps with the time range of the first keyword/period pair; receiving, from the second user, second content associated with the search term of the second keyword/period pair and a second price to be paid if the content is selected by another user when displayed to the user; receiving from a third user, a request for information, the request being associated with the search term of the first keyword/period pair and the request occurring during said overlap; determining, with a processor, a first ranking value for the first content based on (a) information associated with the first content other than the first and second price, (b) the first price when the first price is higher than the second price, and (c) another price higher than the second price when the second price is higher than the first price; determining, with a processor, a second ranking value for the second content based on (a) information associated with the second content other than the first and second price and (b) the second price; selecting, with a processor, the first content if the first ranking value is higher than the second ranking value; selecting, with a processor, the second content if the second ranking value is higher than the first ranking value; and displaying the selected content to the third user.

In still another aspect, a method is provided that includes: receiving a plurality of advertisements associated with a search term and a selection price for each advertisement where the selection price is paid after the advertisement is provided to a user; associating an advertisement with a designated time range; receiving a query from a user that includes the search term; determining, with a processor and for each advertisement, a priority value based on a priority function whereby the function returns (a) when the selection prices of the advertisements are equal and the query is received at a time outside of the designated time range, the advertisement with the greatest estimated likelihood of being selected by the user, (b) when the advertisements have an equal estimated likelihood of being selected by the user and the query is received outside of the designated time range, the advertisement with the highest selection price and (c) when the advertisements have an equal estimated likelihood of being selected by the user and the query is received at a time within the designated time range, the advertisement associated with the designated time range; and providing the advertisement with the highest priority value to the user.

In yet another aspect, a method is provided that includes: receiving a set of advertisements associated with a search term and a selection price for each advertisement where the selection price is paid when the advertisement is accepted by a user; receiving an identification of an option from a first user, where an option is associated with the search term and a designated time range; receiving a query from a second user that includes the search term; determining, with a processor and for each advertisement, a priority value based on a priority function such that (a) the priority value increases with increasing estimated likelihood that the advertisement will be selected by the second user, and (b) the priority value of an advertisement associated with the first user is greater than another advertisement when the option is applicable and such estimated likelihood of the two advertisements are the same; and displaying the advertisement with the highest priority value more prominently than the other advertisements among the set of advertisements, wherein the option is applicable when the first user exercised the option, the query was received during the designated time range, and one of the advertisements is associated with the first user.

A further aspect provides a method that includes: receiving a plurality of advertisements, each advertisement being associated with a user, a search term and a selection price where the selection price is paid when the advertisement is displayed to and selected by a user; receiving a highest-bidder designation, where a highest-bidder designation associates a user with a search term; receiving, from a requesting user, a request for information related to a search term; identifying, with a processor, a plurality of advertisements based on the search term of the request; designating, with a processor, an advertisement as the highest-bidder advertisement when the advertisement's search term and user corresponds with the bidder designation's associated search term and user; determining, with a processor, a ranking value for each identified advertisement, the ranking value of each advertisement being based on the following components: (a) the estimated likelihood that the advertisement will be selected by the requesting user, (b) the selection price of the advertisement unless the advertisement is designated as the highest-bidder advertisement, (c) the selection price of the identified advertisement with the highest selection price, if the advertisement is designated as the highest-bidder advertisement, and (d) the number of highest-bidder designations associated with the advertisement's associated user; displaying the identified advertisement with the highest ranking value more prominently than the other identified advertisements.

A still further aspect provides a method that includes: providing, via a network, a plurality of bids where a bid comprises content to be displayed to a user, a price to be paid when the content is accepted by a user, and a search term; providing a designation of a bid; receiving an indication of payments to be made, the payment being based on the price and the display of a provided bid's content to users, wherein content was selected for display by a processor, and displaying the indication on an electronic display; wherein the processor selected the content based on a comparison of the provided bids' content and price relative to the content and price of other bids that were associated from other users and associated with the same search term, where the processor used a provided bid's price for comparison if the provided bid was not designated, and where the processor uses the highest price of the other bids as the provided bid's price if the provided bid was designated.

Other aspects relate a system that includes a processor, instructions operable by the processor, a user input device for providing data to the processor, a display displaying data processed by the processor in accordance with the instructions, a medium storing the instructions, and an electronic memory storing data accessed by the processor. The instructions include: receiving, via a network, a bid from each bidder among a plurality of bidders, where a bid comprises content to be displayed to a user, a price to be paid by the bidder when the content is accepted by a user, and a search term; designating a bid among the plurality of the bids; receiving, via a network, a request for information from a user, and a search term; selecting, with a processor, a bid based on a comparison of the request's search term with the bid's search term, and further based on a quality component and a price component, wherein the quality component is based on an estimate of the user's interest in the bid's content, wherein the price component of the bids that are not designated is based on the bid's price, and wherein the price component of the designated bid is based on the highest price associated with the plurality of bids; and providing, over the network, the selected bid content to a user.

Yet another aspect also relates to a system that includes a first computer at a first node of a network, where the first computer has access to instructions operable by the first computer, a set of advertisements and likelihood data related to the likelihood of a user being interested in the advertisements, each advertisement is associated with a search term and a price to be paid after the advertisement is provided to a user, and each advertisement is further associated with an advertiser. The system also includes a client device at a second node of the network different from the first node, where the client device includes a user input device, an electronic display, a processor and instructions operable by the processor. The instructions of the first computer include: receiving a designation of an advertiser and a time range; receiving a query from a user that includes a search term; identifying a plurality of advertisements associated with the query's search term; determining whether an advertisement is a highest-bidder advertisement, where an advertisement is a highest-bidder advertisement when it associated with the designated advertiser and the query is received during the designated time frame; determining, for each identified advertisement, a ranking value based on (a) the likelihood data, (b) the price of the advertisement when the advertisement is not a highest-bidder advertisement, and (c) the highest price associated with the other identified advertisements when the advertisement is the highest-bidder advertisement; and providing an advertisement to the client device based on the ranking value. The instructions of the client device include: transmitting the query to the first computer and displaying, on the electronic display, the advertisement provided by the first computer.

Still another aspect relates to a computer-usable medium including a program executable by a processor comprising: computer code that receives, via a network, a bid from each bidder among a plurality of bidders, where a bid comprises content to be displayed to a user, a price to be paid by the bidder when the content is accepted by a user, and a search term; computer code that designates a bid among the plurality of the bids; computer code that receives, via a network, a request for information from a user and a search term; computer code that selects, with a processor, a bid based on a comparison of the request's search term with the bid's search term, and further based on a quality component and a price component, wherein the quality component is based on an estimate of the user's interest in the bid's content, wherein the price component of the bids that are not designated is based on the bid's price, and wherein the price component of the designated bid is based on the highest price associated with the plurality of bids; and computer code that displays, on an electronic display, the elected bid's content to a user.

BRIEF DESCRIPTION OF THE DRAWINGS

FIG. 3 is a screen shot of the entry of advertisement information and highest bidder information in accordance with an aspect of the system and method.

FIG. 4 is a screen shot of the entry of advertisement information and highest bidder information in accordance with an aspect of the system and method.

FIG. 5 is a screen shot of the entry of advertisement information and highest bidder information in accordance with an aspect of the system and method.

FIG. 17 is a screen shot relating to the resale of highest-bidder status in accordance with an aspect of the system and method.

DETAILED DESCRIPTION

Figure 1:
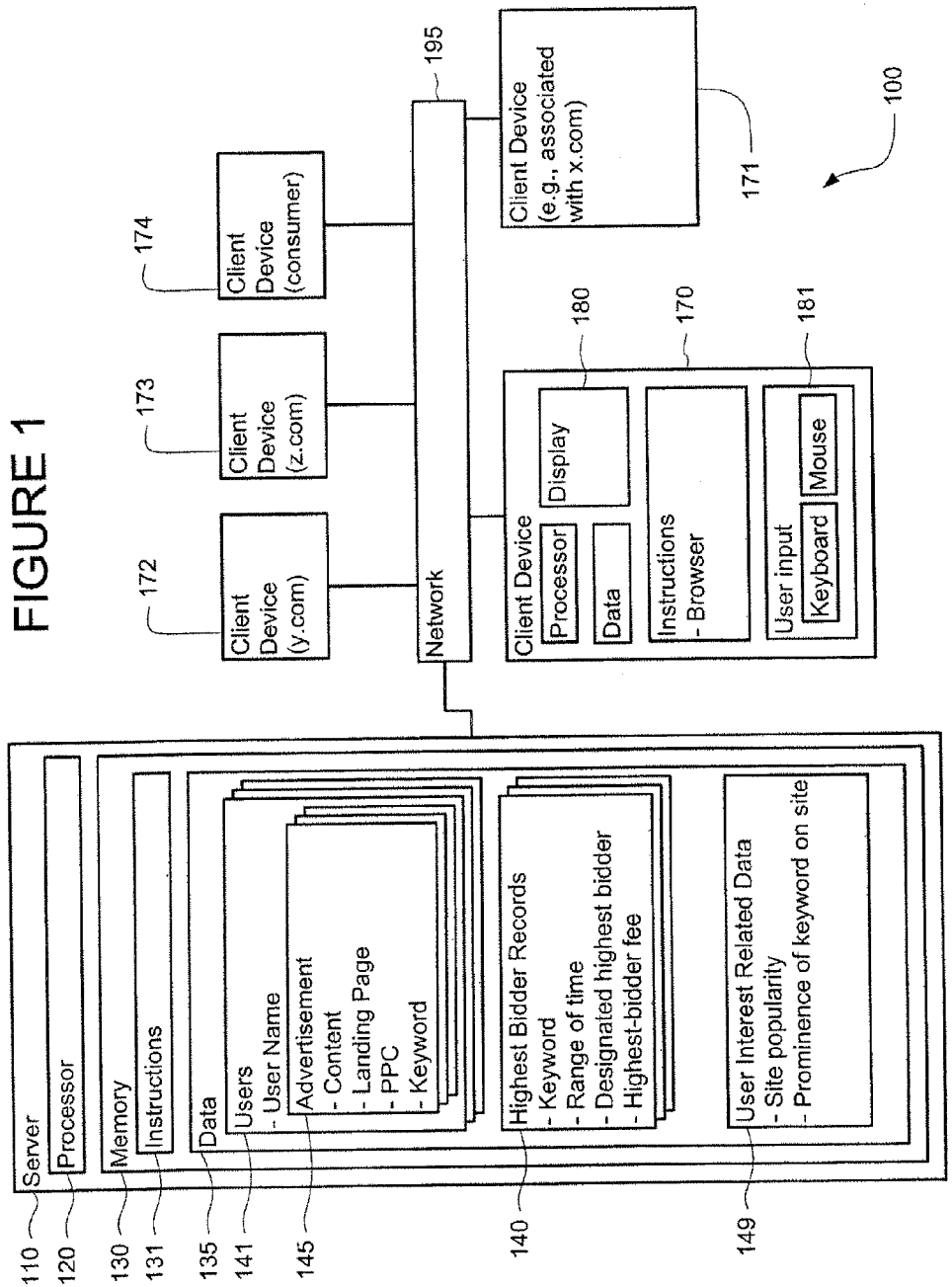
FIG. 1 is a functional diagram of a system in accordance with an aspect of the system and method.

In at least one aspect of the system and method, an advertisement is not guaranteed to be displayed to every user that is evidencing an interest in the advertisement's keyword. For example, when a user searches for a particular word, it may not be possible or desirable to display all of the advertisements that match that word, or to display the advertisement in a format that all advertisers would prefer. For instance, web page locations that cause an advertisement to be listed first or close to the user-requested information may be considered more desirable.

In such aspects, the server may determine the display of an advertisement (e.g., whether it is displayed and its format if it is displayed) based on various criteria. One criteria relates to the advertisement's PPC, with preference being given to those advertisements having a higher PPC than other advertisements.

In that regard, the system and method may allow an advertisement to be evaluated as if the advertiser has agreed to pay the highest PPC relative to other advertisements being considered for display (such an advertiser being referred to herein as the "highest bidder"). The advertisement may be so evaluated even if the actual PPC of the advertisement is much lower than the PPC of other advertisements.

While a highest bidder's advertisement may be evaluated as if it has the highest PPC, at least one aspect of the system and method only charges the highest bidder at its actual PPC. In other words, a first advertisement may be displayed more prominently than a second advertisement based on its highest bidder status (e.g., at a better position or in lieu of the second advertisement), but still incur lower fees per click than the second advertisement.

An advertiser may be required to pay a fee in order to be designated as the highest bidder.

The system and method may also restrict the extent to which an advertiser will be considered the highest bidder. For example, an advertiser may only be designated as the highest bidder with respect to certain keywords, or with respect to certain time periods. Indeed, an advertiser's highest-bidder status may be restricted by both keyword and time period.

In at least one aspect, the system and method does not automatically give the greatest preference to the highest bidder's advertisement relative to other advertisers. Rather, other criteria may be factored in as well, such as the likelihood that a user will be interested in the advertisement.

Therefore, even if an advertiser is considered the highest bidder, its advertisements may still be displayed less prominently relative to other advertisements.

Yet further, the highest bidder status may be purchased as an option such that the user is not required to commit to the PPC until a later date.

In addition, the system and method may permit a user to sell its highest bidder status to other users. The system and method may place restriction on such resale, or decrease the likelihood of the advertisement being displayed if the type of resale or reseller is considered undesirable.

Figure 2:
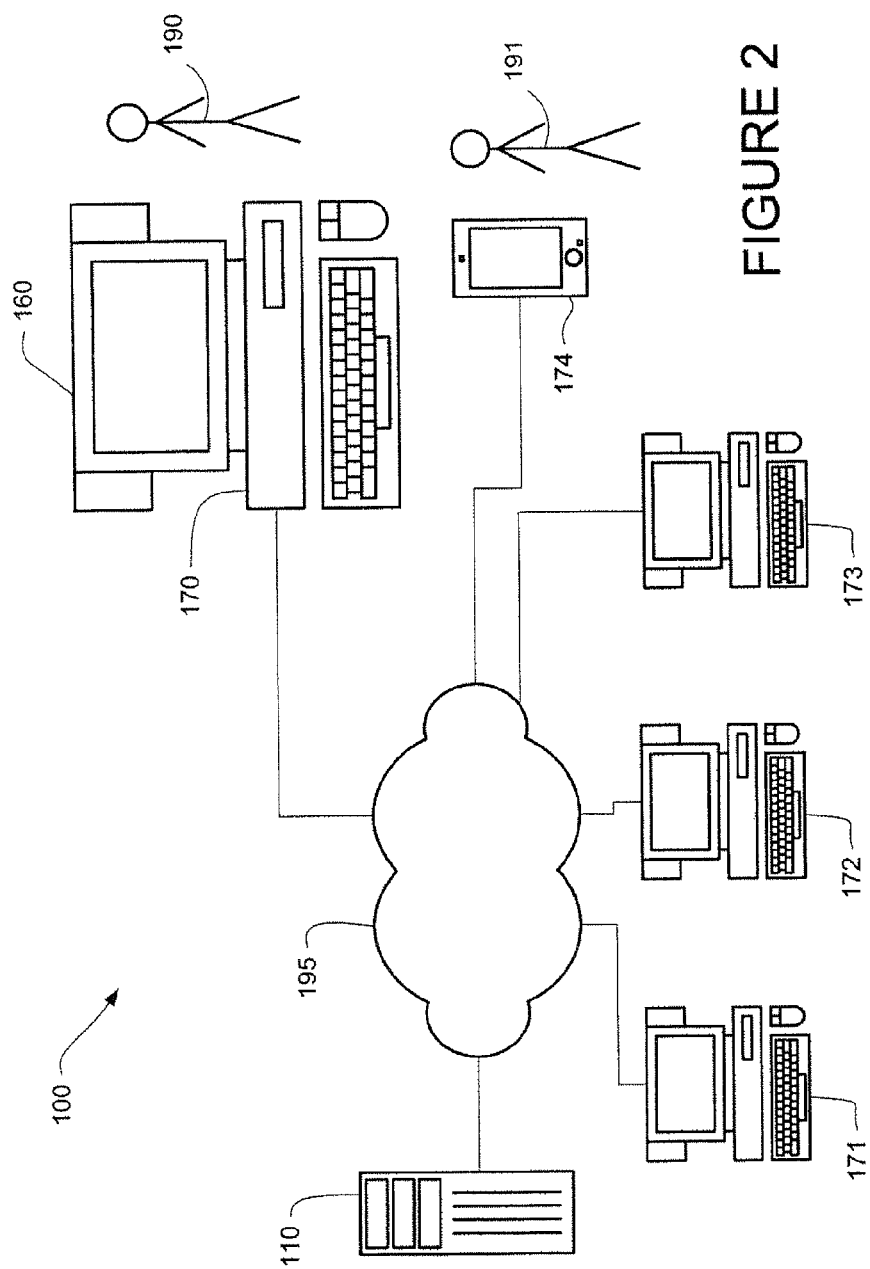
FIG. 2 is a pictorial diagram of a system in accordance with an aspect of the system and method.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120. It also includes data 135 that may be retrieved, manipulated or stored by the processor. The memory may be of any type capable of storing information accessible by the processor, including a computer-readable medium such as a hard-drive, memory card, ROM, RAM, DVD or other optical disks, as well as other write-capable and read-only memories. The processor 120 may be any well-known processor, such as processors from Intel Corporation or AMD. Alternatively, the processor may be a dedicated controller such as an ASIC.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents or flat files. The data may also be formatted in any computer-readable format such as, but not limited to, binary values, ASCII or Unicode. By further way of example only, image data may be stored as bitmaps comprised of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable DVD-ROM and others within a read-only computer chip. Some or all of the instructions and data may be stored in a location physically remote from, yet still accessible by, the processor. Accordingly, references to a processor or computer will be understood to include references to a collection of processors or computers that may or may not operate in parallel.

The computer 110 may be at one node of a network 195 and capable of directly and indirectly communicating with other nodes of the network. For example, computer 110 may comprise a web server that is capable of communicating with client devices 170-74 via network 195. Yet further, server 110 may use network 195 to transmit and display information to user 190 on monitor 180 of client device 170. Server 110 may also comprise a plurality of computers that exchange information with different nodes of a network for the purpose of receiving, processing and transmitting data to the client devices; in this instance, the client devices will typically still be at different nodes of the network than any of the computers comprising server 110.

Network 195, and intervening nodes between server 110 and client devices, may comprise various configurations and use various protocols including the Internet, World Wide Web, intranets, virtual private networks, wide area networks, local networks, private networks using communication protocols proprietary to one or more companies, cellular and wireless networks, Internet relay chat channels (IRC), instant messaging, simple mail transfer protocols (SMTP), Ethernet, WiFi and HTTP, and various combinations of the foregoing. Although only a few computers are depicted in FIGS. 1-2, it should be appreciated that a typical system can include a large number of connected computers.

Each client device may be configured similarly to the server 110, with a processor, memory and instructions. Each client device 170-74 may be a personal computer, intended for use by a person 190-191, having all the internal components normally found in a personal computer such as a central processing unit (CPU), display device 180 (for example, a monitor having a screen, a projector, a touch-screen, a small LCD screen, a television, or another device such as an electrical device that is operable to display information processed by a processor), DVD drive, hard-drive, user input 181 (for example, a mouse, keyboard, touch-screen or microphone), speakers, modem or network interface device (telephone, cable, wireless or otherwise), and all of the components used for connecting these elements to one another.

Although the client devices 170-74 may comprise a full-sized personal computer, the system and method may also be used in connection with mobile devices capable of wirelessly exchanging data with a server over a network such as the Internet. For example, a client device 174 may be a wireless-enabled PDA such as a Blackberry phone or an Internet-capable cellular phone. The user may input information using a small keyboard (in the case of a Blackberry phone), a keypad (in the case of a typical cell phone), a touch screen (in the case of a PDA) or any other user input device. Indeed, computers in accordance with the systems and methods described herein may comprise any device capable of processing instructions and transmitting data to and from humans and other computers including general purpose computers, network computers lacking local storage capability, and set-top boxes for televisions.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

In at least one aspect, server 110 may be associated with a search engine. For example, users may use the client devices 170-74 to transmit queries to the server and, in response, the server may transmit web pages containing the results of the search in response.

Data 135 may contain records 140 that associate a search term with a range of time. For instance, one record may pair the search term "resolution" with the time range "Jan. 1-6, 2010". For ease of explanation, this description may refer to the search terms of a record as comprising a single keyword. However, in lieu of a single keyword, the search term may also comprise multiple words, portions of words, audio information, visual information, and any other information that may be used to query and identify other data.

Similarly, while this description may refer to the ranges of time as ranges of days for ease of explanation, the records may refer to any time period including periods of time that are years, weeks, hours or minutes long. In that regard, it will be understood that references to dates and ranges of dates may include other ranges of time as well. It may also refer to ranges of time that are absolute (e.g., the day beginning Jan. 1, 2010 at 12:00 a.m., or any moment in time after January 3 at 1:23 p.m.) or dependant upon other criteria (e.g., the half-time of a football championship game).

As explained in more detail, the same records may further designate a user as the "highest bidder" for the particular keyword/period pair. The records 140 may also identify the fee paid by the user for such designation.

User data 141 identifies users of the systems, i.e., any entity that interacts with the system and method such as businesses or people. For example, one user may be the owner of a gym named "X Gym".

At least some users may be associated with one or more advertisements 145 that the user would like to have rendered to other users (references herein to "advertisers" refers to such users.) Each advertisement within the set of advertisements 145, in turn, may be associated with content (i.e., information that the advertiser has indicated an interest in being rendered to other users) and a search term by which the content is retrieved. For instance, the user "X Gym" may have stored an advertisement having the text content "X Gym—a great gym at a great price" and associated the advertisement with the keyword "resolution". As noted below, each advertisement may also be limited to a particular time period.

Each advertisement may be associated with a price. For ease of explanation, this description may refer to the price as a price-per-click (PPC), i.e., the price that the advertiser is willing to pay each time a user selects the advertisement. However, in lieu of PPC, it will be understood that the system and method may be used in connection with any compensation, such as charging an advertiser each time the content is displayed to a user in response to the user entering in a search term that at least partially matches the advertisement's keyword (e.g., cost-per-view), each time a product or service is subsequently purchased by a user that viewed the advertisement (e.g., cost-per-action) or each time a quantity of qualifying events occur (cost-per-mille). In that regard, while the system and method may be particularly advantageous when used in connection with advertising, the uses described herein in connection with advertisements may be applied to other types of content as well.

Each advertisement may also identify a node of the network 195 to which a user will be directed in response to selecting advertisement.

Data 135 may also store data 149, which comprises data from which the server 110 may estimate the likelihood of a user being interested in an advertisement. For example, when processor 120 ranks advertisements for display, it may access data indicative of the popularity of a website; many users are more likely to select an hyperlinked advertisement when they know the site that the link points to. For the purposes of this description, the user interest data 149 is considered to exclude the price that an advertiser will pay for the advertisement.

In addition to the operations illustrated in the figures containing flowcharts, operations in accordance with a variety of aspects of the invention will now be described. It should be understood that the following operations do not have to be performed in the precise order described below. Rather, various steps can be handled in reverse order or simultaneously. It will be further understood that the sample values, types and configurations of data shown in the figures are for the purposes of illustration only. In that regard, system and methods in accordance with the present invention may include different data values, types and configurations, and may be provided and received at different times (e.g., via different web pages) and by different entities (e.g., some values may be pre-suggested or provided from different sources).

FIG. 3 illustrates just one manner in which a user may become the designated highest bidder for an advertisement. Server 110 may display web page 310 on the electronic display of client device 171 by transmitting web page 310 to the client device, which displays the page with the aid of web browser 300 such as the Google Chrome browser. For the purposes of this example, client device 171 is assumed to be operated by a person associated with the user "X Gym," network 195 is assumed to be the Internet, and the network address of the client device 171 is assumed to be associated with the URL "www.x.com". The web page may also display the current date 332.

The user may use the webpage to enter various information, such as the advertisement's keyword 320, information 321 identifying the user, a unique identifier 322 for the advertisement (shortened in this example and later examples to simply "X" and "Advertisement X" for ease of explanation), the content 326 and landing page 327. The advertiser may also identify the maximum PPC 323 that it is willing to pay when the advertisement is displayed to, and subsequently selected by, another user.

The advertiser may also limit the time period it is willing to pay for the advertisement such as by entering a starting date 324 and an ending date 325.

The advertiser may further enter a highest bidder fee 328. If the system and method accepts the fee, the system and method will designate the user as the highest bidder for the particular keyword/period pair. For example, server 110 may modify highest bidder records 140 to indicate that "X Gym" is the highest bidder for the keyword "resolution" during the time period extending from Jan. 1, 2010 through Jan. 7, 2010. In exchange for its designation as the highest bidder, the advertiser may be immediately or subsequently charged the highest bidder fee.

Other advertisements may have keywords and time periods that overlap with that of the highest bidder. For example, as shown in FIG. 4, server 110 may display web page 410 on the electronic display of client device 172. The advertisement of FIG. 4 ("Advertisement Y") identifies the same keyword 420 ("resolution") and a time period 424-25 (Jan. 1-3, 2010) that overlaps with Advertisement X. If a previous advertisement has already obtained highest-bidder status for the keyword during the relevant time period, the system and method may preclude the advertiser from becoming the highest bidder or entering a fee in highest-bidder fee field 428.

FIG. 5 provides another example of an advertisement ("Advertisement Z") where the user is associated with client device 173 and has submitted an advertisement for the same keyword and an overlapping time period.

Figure 6:
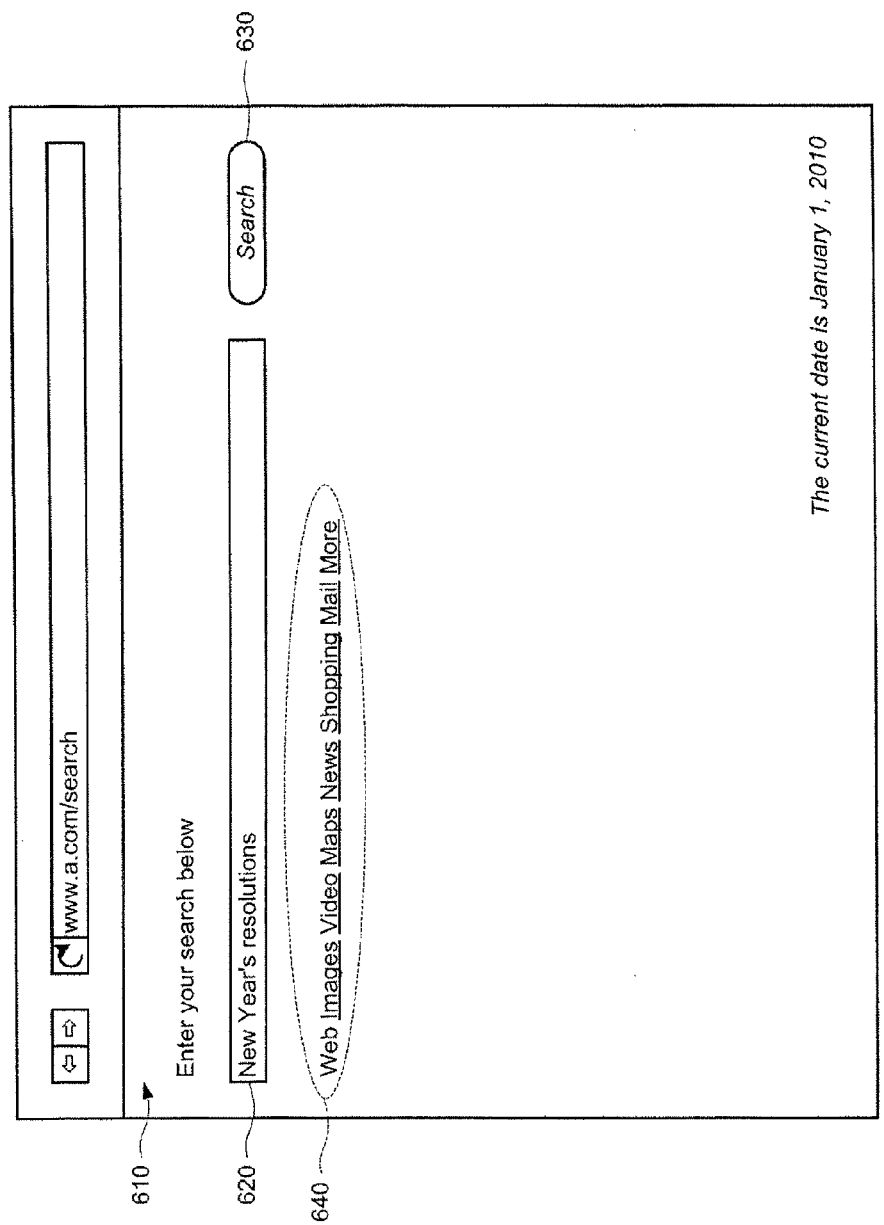
FIG. 6 is a screen shot of the entry of search information in accordance with an aspect of the system and method.

The data associated with the advertisements, including the highest-bidder status, may be used to select advertisements for display to other users, such as users searching for information at the site associated with server 110. For example, as shown in FIG. 6, the server 110 may provide a consumer at client device 174 with a web page 610. The page may include a text box 620 for entering a search query such as "New Year's resolutions", a button 630 for instructing the server 110 to perform the search, and filters 640 for limiting the scope of the search.

When the system and method performs the user-requested search, it may select advertisements to display to the user based on the user's search terms. As shown by way of example in FIG. 7, server 110 may use one or more of the search terms to identify advertisements having keywords that completely or partially match one of the user's search terms, such as the word "resolution".

The system and method may also determine the date and time of the user-requested search and limit its selection of advertisements to those advertisements having starting and ending date ranges that include the date and time of the request.

The system and method may iterate through the matching advertisements in an attempt to determine whether an advertisement should be displayed and, if so, its format (e.g., location and size). In that regard, the processor may determine a priority value for each matching advertisement where the value indicates how high each advertisement will be ranked relative to the other advertisements.

The non-PPC parameter of the ranking function may be determined based on data used to estimate the likelihood of the advertisement being of interest to the user. By way of example only, such data may include the popularity of the website that is the target of the advertisement. The popularity of the website, in turn, may be determined based on multiple factors, such as the number of visitors to the site, the number of users that selected the site when it was listed among other search results or advertisements, the number of back links to the site, the popularity of the sites that back link to the site, etc. This data, in turn, may be calculated to produce one or more values such as a value between 0 and 1 where a higher value indicates a greater likelihood that the user will be interested in the advertisement.

Figure 7:
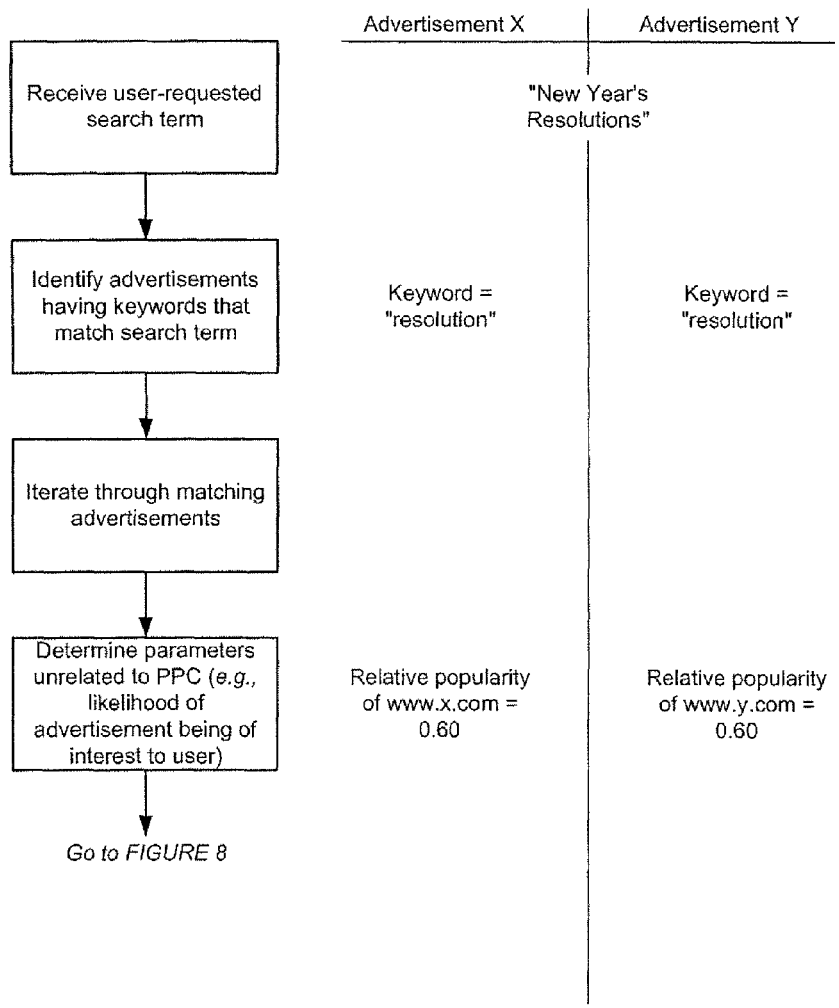
FIG. 7 is a flow chart and a diagram of sample data in accordance with an aspect of the invention.

Although the following descriptions primarily focus on popularity of the landing site as the non-PPC parameter for the purposes of illustration, it will be understood that any data unrelated to the PPC—such as the prominence of the keyword on the advertiser's site and how well the search term matches other information contained in the advertisement—may be used as well. In the example of FIG. 7, both Advertisement X and Y are assumed to have the same popularity values (0.60).

Figure 8:
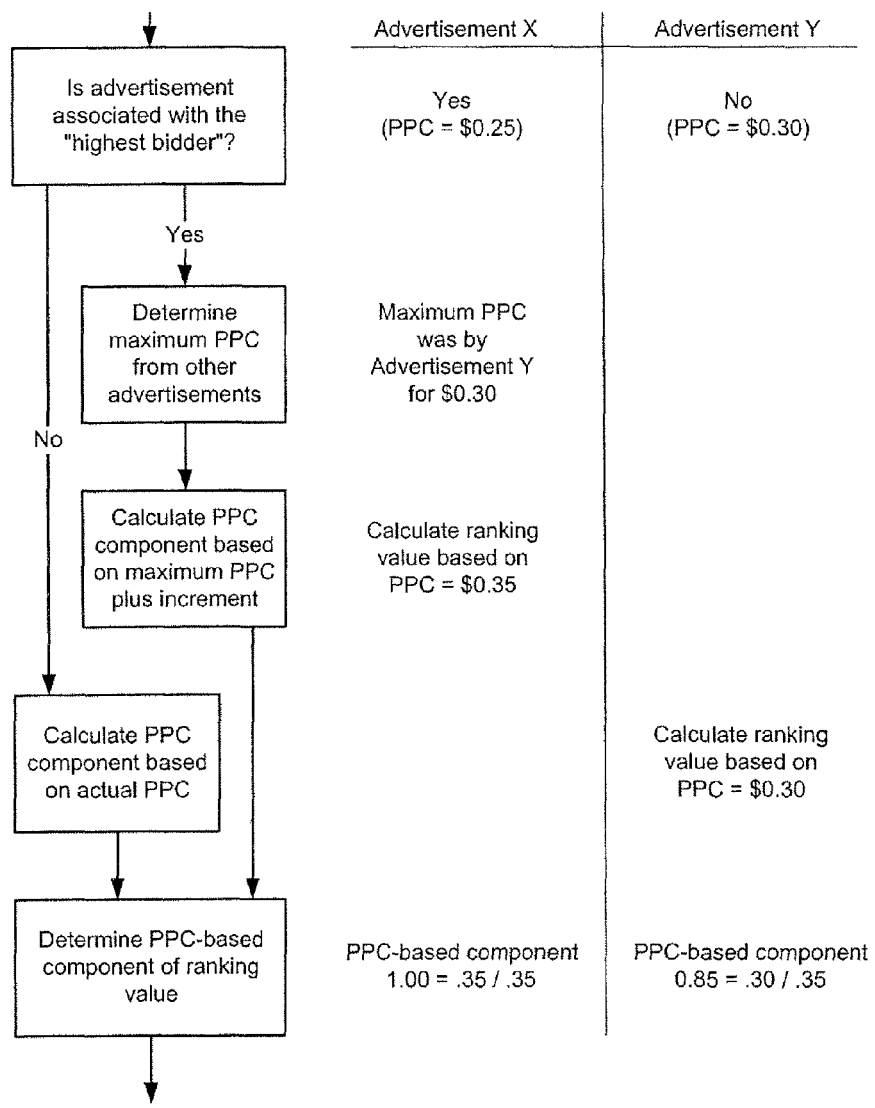
FIG. 8 is a flow chart and a diagram of sample data in accordance with an aspect of the invention.

If the advertisement is associated with the highest bidder, the advertisement will also be ranked as if the advertiser is paying more for the advertisement than any other matching advertisement. FIG. 8 provides an example of how the PPC parameter of the ranking value of Advertisement X and Advertisement Y may be determined.

The system and method may first determine whether the advertisement is associated with the highest bidder.

If the advertisement is associated with the highest bidder, a processor may determine the maximum PPC of all of the advertisements being considered for display and calculate the PPC of the highest bidder's advertisement based on that maximum plus an increment. For example, because the advertiser of Advertisement X is the highest bidder, the system and method determines the highest PPC (Advertisement Y's PPC of $0.30) and calculates the ranking value for Advertisement X based on that highest PPC plus an increment (e.g., $0.35=$0.30 (maximum PPC)+$0.05 (increment)).

If the advertisement is not associated with the highest bidder, the PPC parameter of the ranking value may be calculated based on the advertisement's current PPC value. In Advertisement Y's case, the ranking value will thus be calculated based on its PPC of $0.30. By way of example only, if the PPC parameter of the ranking is based on the function PPC Component=(advertisement's PPC after highest bidder adjustment)/(maximum PPC of advertisements after highest bidder adjustment), the PPC-component values of Advertisements X and Y would be 1.00 and 0.85, respectively.

Many other functions may also be used to insure that the highest bidder's advertisement is considered to have the highest PPC when determining the advertisement's display. For example, if the PPC parameter is typically limited to values from 0 to less than 1, the system and method may set the PPC parameter to 1.

Figure 9:
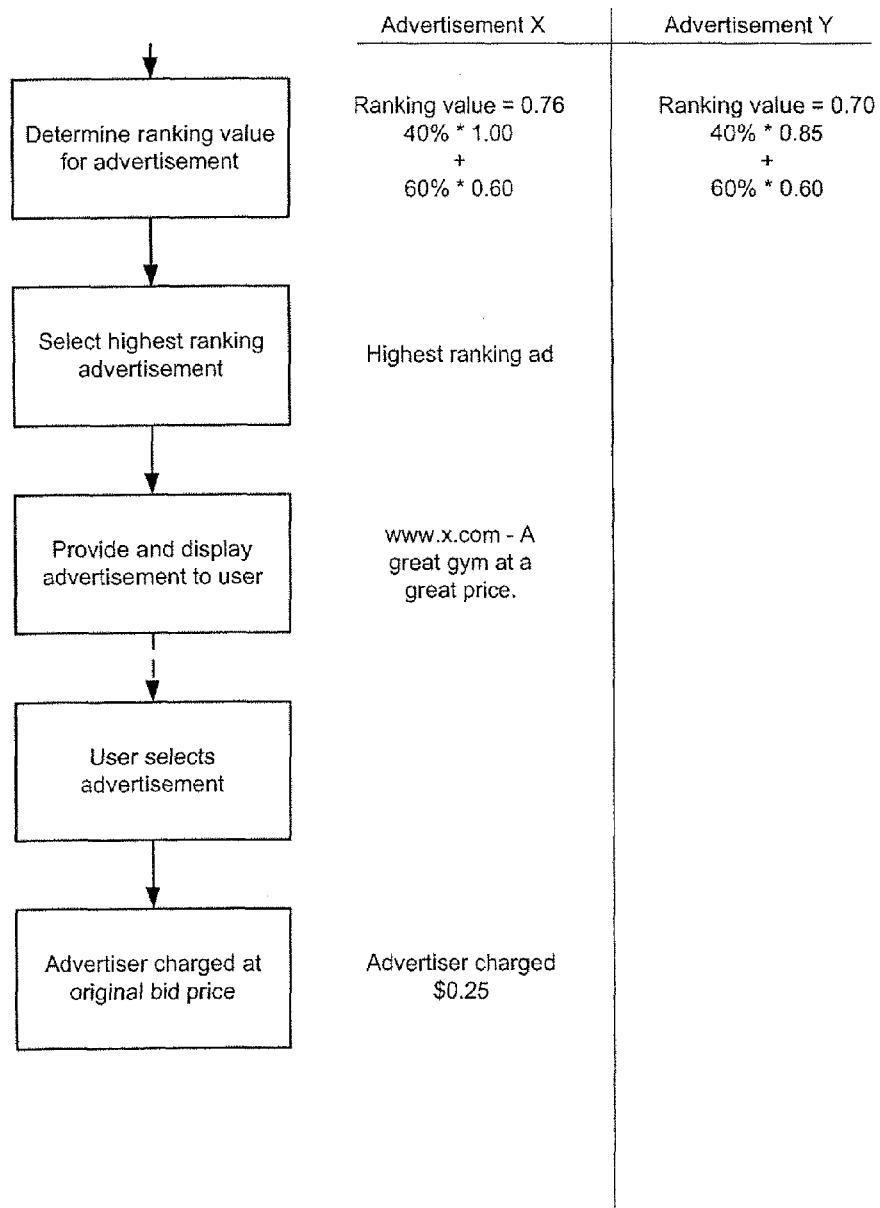
FIG. 9 is a flow chart and a diagram of sample data in accordance with an aspect of the invention.

The system and method may rank the matching advertisements based on their PPC and non-PPC components. As shown in FIG. 9, the ranking value may be calculated by applying weights to the components, such as by adding 40% of the PPC component to 60% of the non-PPC component. In that example, if the PPC parameter values of two advertisements were equal, the highest ranking value would depend on the non-PPC parameter value. If the non-PPC parameter values of two advertisements were equal, the highest ranking value would depend on the PPC parameter value. Thus, given two advertisements having equal likelihood of being interesting to the user, the system and method may select the advertisement with the highest PPC—unless one of the advertisements is associated with the designated highest bidder, in which case that advertisement would be selected.

The highest ranked advertisement may then be selected for the most prominent display to the user. For example, if only one advertisement is to be displayed and the only two matching advertisements were Advertisement X and Advertisement Y, Advertisement X would be selected because its ranking value of 0.76 is higher than Advertisement Y at 0.70. This occurs in spite of the fact that the two advertisements were determined to be equally interesting to a user and Advertisement Y actually has a higher PPC than Advertisement X.

Figure 10:
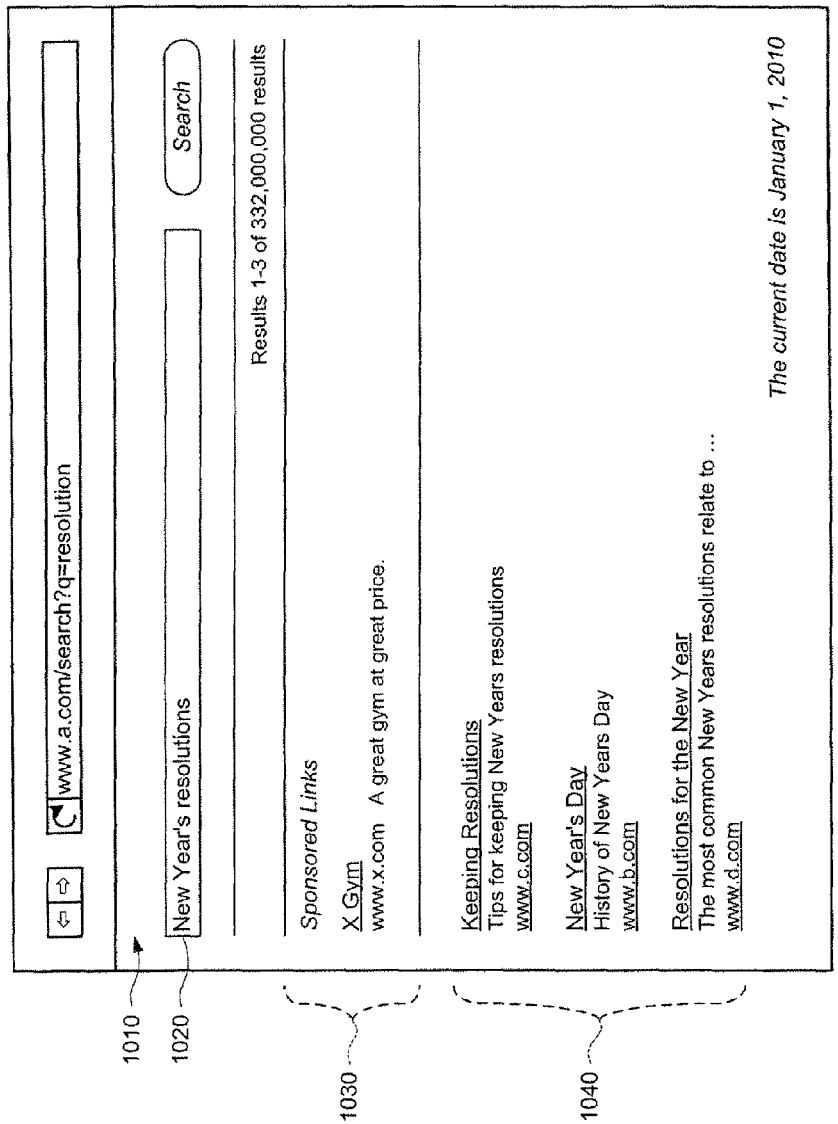
FIG. 10 is a screen shot of search results and advertising in accordance with an aspect of the system and method.

FIG. 10 provides an example of the selected advertisement and the results seen by the user based on the foregoing sample data. The web page 1010 transmitted by server 110 to client device 174 may display the original search query 1020, the selected advertisement 1030 and other search results matching the search query.

In one aspect of the system and method, the advertiser of the selected advertisement, including the highest bidder, is charged at the agreed-upon PPC even it was displayed based on an assumption that the PPC was much higher. For example, if the user of client device 174 selects advertisement 1030 to navigate to www.x.com, the advertisement of Advertisement X will be charged $0.25 (corresponding with the original PPC) instead of the PPC ($0.35) that was used to rank the advertisement relative to other matching advertisements.

As a result, when the advertisement is selected, the advertiser associated with the selected advertisement may be provided with an indication of the charge (e.g., broken out individually each time the advertisement was selected, or in the aggregate with other charges).

Figure 11:
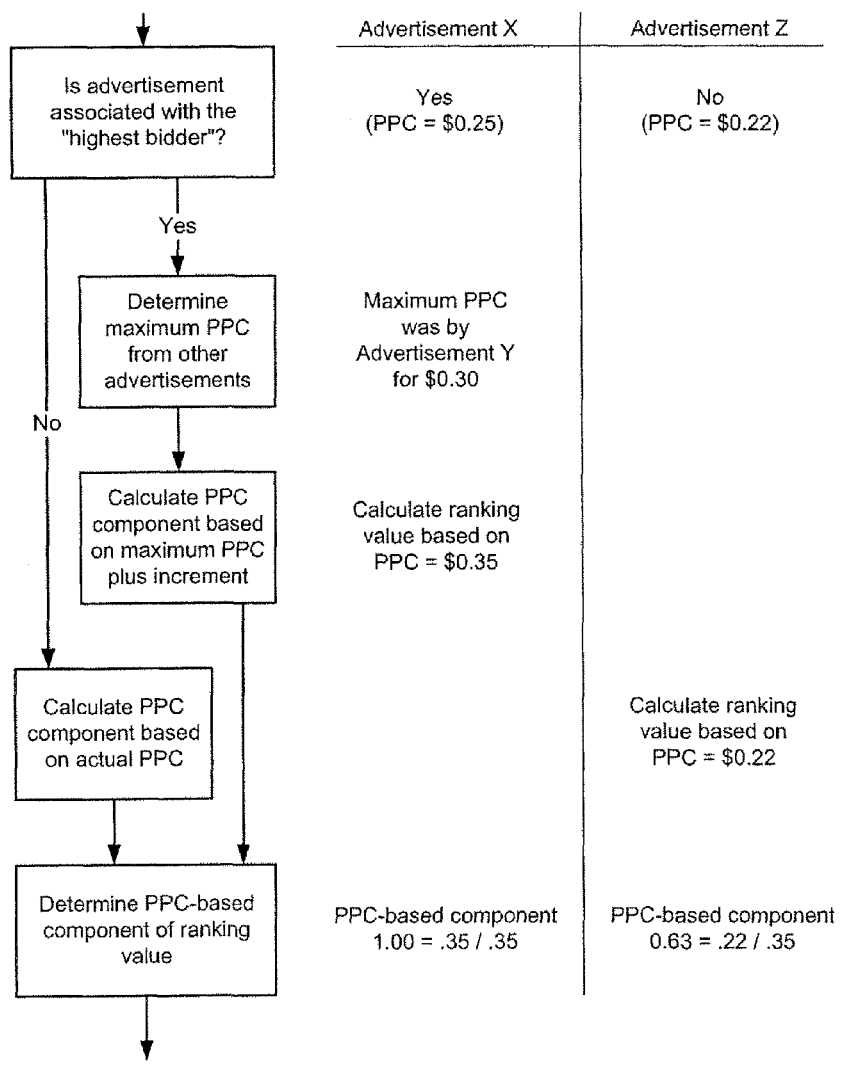
FIG. 11 is a flow chart and a diagram of sample data in accordance with an aspect of the invention.
Figure 12:
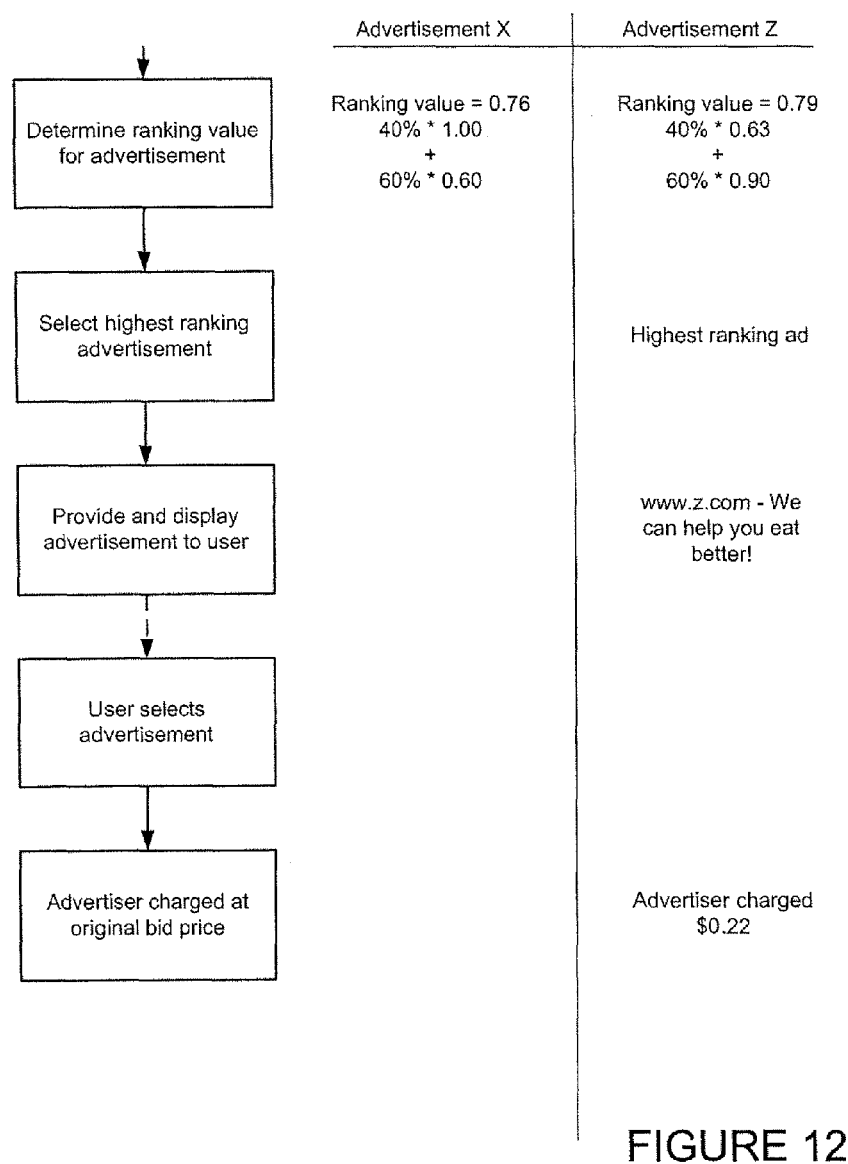
FIG. 12 is a flow chart and a diagram of sample data in accordance with an aspect of the invention.
Figure 13:
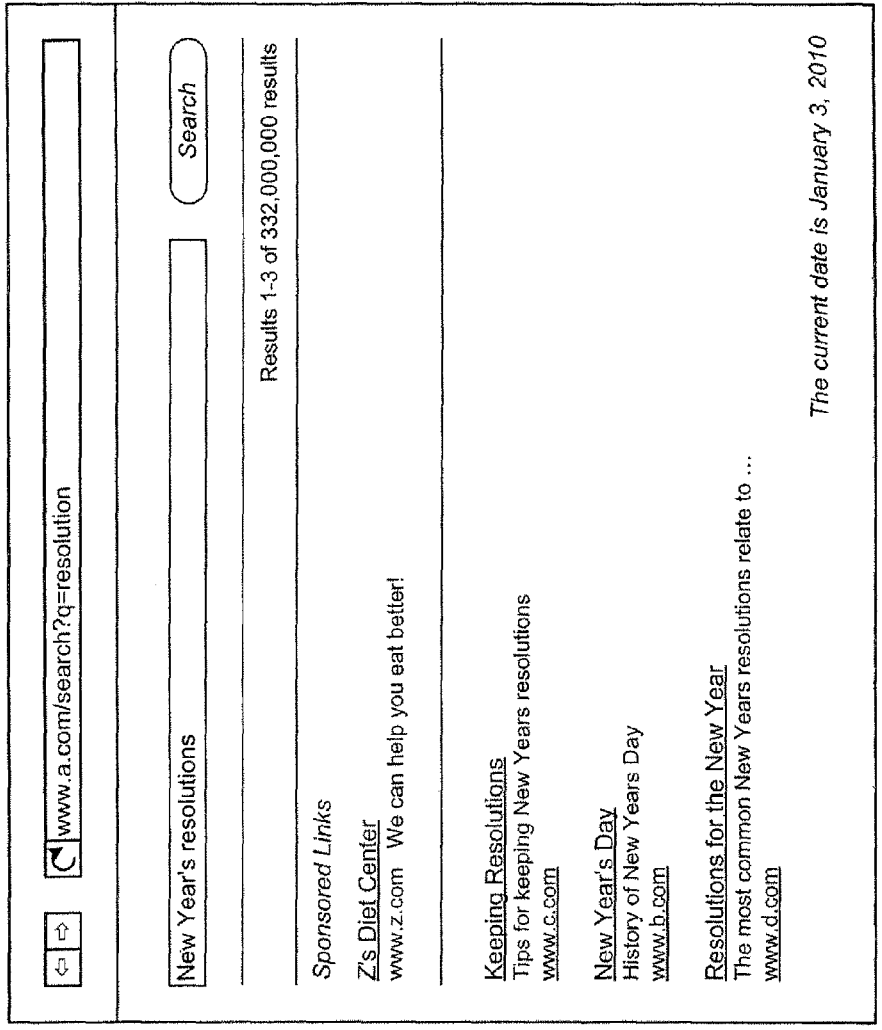
FIG. 13 is a screen shot of search results and advertising in accordance with an aspect of the system and method.

Having highest bidder status may not always result in the advertisement being selected for display. FIGS. 11-13 assume the same data and circumstances as FIG. 10, except it may be further assumed that the user of client device 174 conducted the search on Jan. 3, 2010, e.g., a date falling within the eligible dates of Advertisement Z. As shown in FIG. 11, the Advertisement X's PPC-based component is calculated based on $0.35 in order to insure that is higher than both Advertisement Y's and Z's bids, e.g., $0.30 and $0.22, respectively. The PPC-based component of Advertisement Z's ranking value is thus even lower than Advertisement Y's. However, the landing site of Advertisement Z may be significantly more popular (0.90) than the target of Advertisement X (0.60). As a result and as shown in FIG. 12, its total ranking value of 0.79 is higher than Advertisement X's ranking value of 0.76. As shown in FIG. 13, Advertisement Z may be displayed as a sponsored link 1330 to the user instead of the advertisement of the highest bidder.

In that regard and in accordance with one aspect of the invention, the advertiser's submission of the advertisement may be a bid that the content be displayed such that the advertiser is, or is not charged, depending on whether the bid is accepted. The acceptance may be conditioned on various criteria. For example, the price may be conditioned on displaying the advertisement to a user, in which case the user's acceptance of the advertisement's display is sufficient (e.g., requesting and displaying the page containing the advertisement). In other aspects, the price may not be charged unless the user accepts the advertisement by selecting it.

Figure 14:
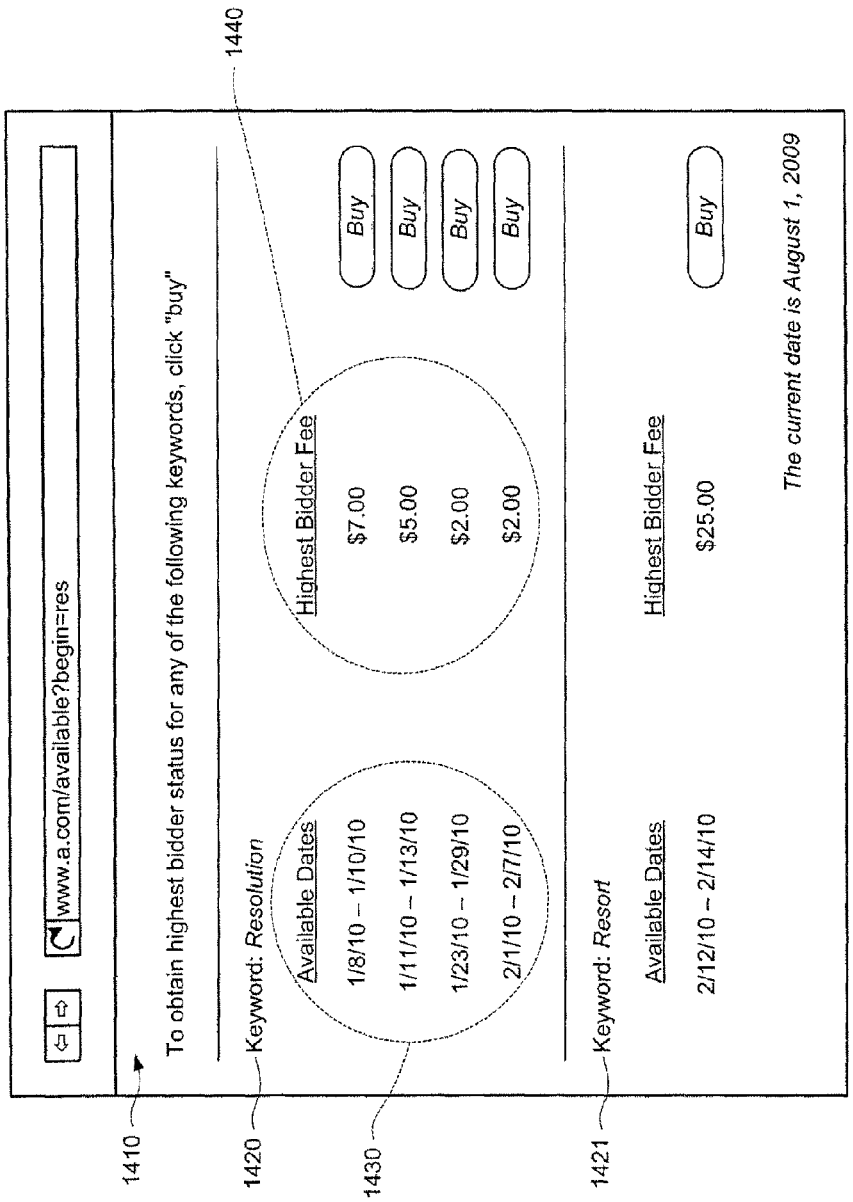
FIG. 14 is a screen shot of available highest bidder keyword/period pairs in accordance with an aspect of the system and method.

The system and method may provide users with the ability to search and list keywords that are available for high bidder status. As shown in FIG. 14, web page 1410 may list keywords 1420-21 and their available dates 1430, e.g., no user was awarded the high bidder status for the listed ranges.

The availability of a keyword/period pair may depend on more than whether there is already a highest bidder for the keyword during that time period. The system and method may also restrict the available dates based on other factors such as not listing dates that are in the near future (e.g., prohibiting highest bidder requests that come less than a few days before the relevant date) or far future (e.g., the date is too far in the future to accurately determine the minimum highest bidder fee).

Moreover, the time period during which an advertisement is considered to be associated with the highest bidder may be different than the period that the advertiser is willing to pay the PPC for the advertisement. For example, even if the highest bidder status is only available for the first week of January, an advertiser may still agree to pay the same PPC for the entire month.

The highest bidder fee may be set in various ways. As noted above, a user may propose a highest-bidder fee. Yet further, the fee may be a fixed fee that applies to every keyword or date range.

The fee may also be set by a person associated with the operator of server 110 who considers the keyword and the date range. For example, this person may set the price based on an assumption that users are more likely to click on advertisements relating to "resolution" in early January than in late January due to New Year's Day. As a result, the person may conclude that early January is the most valuable time to be the highest bidder for the word "resolution" and set the highest-bidder fee accordingly.

The highest-bidder fee may also be determined by a processor based on various data. The data may include a statistical analysis of the dates that a term appears most often in users' searches, the dates that a term is most effective in the selection of advertisements, and previous highest bidder fees and PPCs received for the same or related terms.

Similarly, if a search engine determines that certain keywords have become strongly associated with a particular date in the future in the minds of its users, the processor may increase the highest-bidder fee associated with that keyword/date. For example, if a city is picked for a sporting event and the server 110 suddenly receives numerous searches for the city and date, the server 110 may automatically allocate a highest bidder fee for the city name and relevant dates. Thus, the server may set a highest-bidder fee for the keyword/period pair of "Indianapolis" and February 2012 upon receiving a large number of searches for "football championship Indianapolis February 2012".

Figure 15:
FIG. 15 is a screen shot of user proposals relating to the highest bidder fee and other information for a keyword/period pair in accordance with an aspect of the system and method.

In yet another aspect, the highest-bidder fee may be set based on competitive bids among users. As shown in FIG. 15, the system and method may allow users to propose a highest-bidder fee by entering their own proposed fee 1540 for a particular keyword 1520 during a particular date range 1530. Prior to the start of the applicable time period, the processor may designate the advertiser that is proposing the greatest fee as the highest bidder. Some or all of the other users' proposals may be hidden. The web page 1510 may include textboxes 1570 so that the user can propose a fee.

Highest-bidder status may be awarded based on more than the highest-bidder fee. For example, it may be awarded based on the price-per-click 1550 and the landing site 1560 of the advertisement such that the processor ranks the proposals by assigning a value that is related to the fees that are likely to be generated by each proposal. For example, the processor may assign a priority value to each proposal based on the following function or variants thereof: Proposal Value=(the highest-bidder fee)+(popularity of landing site relative to other proposals)*(PPC)*(duration of time period). The user with the highest proposal value may then be designated the highest bidder for the keyword for the applicable dates.

In at least one aspect, the system and method may allow the highest-bidder status to be purchased as an option. In the context of the system and method, a user holds a highest-bidder option when the user has the right, but not the obligation, to purchase advertisements during the relevant time period at the agreed-upon price and to be considered the highest bidder during such time period.

A highest-bidder option is considered exercised when the holder of the option commits to purchasing the advertisements during the relevant time period for the agreed-upon price; prior to that point, the option is considered unexercised.

Figure 16:
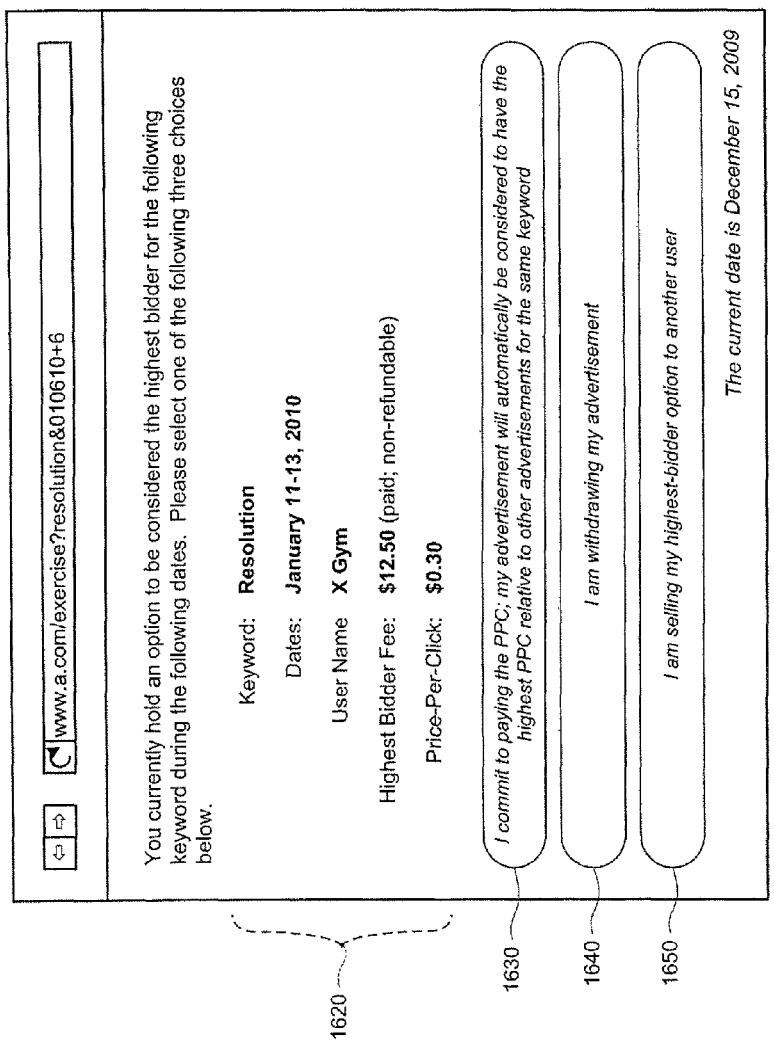
FIG. 16 is a screen shot permitting exercise of a highest-bidder option in accordance with an aspect of the system and method.

The system and method may require users to exercise any unexercised highest-bidder options prior to the relevant time period. For example, as shown in FIG. 16, the user may be reminded of their proposal 1620 and given a choice of either exercising or declining the option by selecting buttons 1630 or 1640, respectively. If the user declines the option, the user is not committed to paying the PPC. The system and method may also make the declined keyword available for other users to become the highest bidder, and retain the option fee that was paid by the option holder. If the user exercises the option, the user becomes committed to paying the PPC and will be the designated the highest bidder during the applicable time period.

Yet another choice may comprise selling the option by selecting button 1650, as explained in more detail below.

The user may be charged a fee in order to receive the option. In one aspect, the option fee is the highest-bidder fee, e.g., the user obtains a highest-bidder option when the user is awarded highest-bidder status and pays the highest-bidder fee to the operator of server 110. In another aspect, the option fee is partially related to or different from the highest-bidder fee, e.g., the user pays a portion of the highest-bidder fee upon receiving the option and the remainder when the user exercises the option.

In still another aspect, the system and method may permit one user to transfer their highest-bidder status to other users. The recipient, in turn, may transfer its highest bidder status to still other users. The resale of highest bidder status may occur independently of or in conjunction with highest bidder options. In other words, the system and method may permit not only the sale of the highest-bidder status, but also the option to be considered the highest bidder.

FIG. 17 provides an example of a webpage that may be presented to the highest bidder after the user has indicated an interest in selling his or her highest bidder status to another user. Information 1720 identifies the keyword, the relevant dates, and other information associated with the seller's status as highest bidder. The webpage 1710 also permits the seller to identify the buyer 1730 and the price 1750 that will be paid by the buyer in order for the buyer to become the highest bidder.

The seller and buyer may be required to independently confirm their consent to the transfer before it takes place.

The system and method may determine whether a sale is valid or invalid based on various criteria. For example, server 110 may restrict the number of times that a user may sell or buy its highest-bidder status within a given time period.

Yet further, the system and method may determine that the transfer of highest bidder status materially changes the conditions under which the seller was awarded highest bidder status. For example, if the seller is particularly prominent, the server 110 may have charged a lower highest-bidder fee than it would charge to other users based on the assumption that more consumers would click on ads for the seller. If the buyer is not as prominent, the server 110 may conclude that the relatively low highest-bidder fee is no longer justified. In that regard, the system and method may reject the sale or require the buyer to pay an additional highest-bidder fee in addition to the fee paid by the seller.

Similarly, the highest-bidder fee may have been determined based on the quality of the landing page of the seller's advertisement. In that regard, the server 110 may require the buyer to identify the landing page 1740 of its advertisement prior to the sale so that the server 110 can evaluate the page's prominence. Other information associated with the buyer's and seller's advertisements may also be evaluated in advance of the sale, such as the content of the advertisement.

When the sale is validated, the system and method may designate the buyer as the highest bidder for the keyword during the relevant time period. For example, as shown in FIG. 1, server 110 may modify highest bidder records 140 for the keyword "resolution" and time period "Jan. 11-13, 2010" to identify the user named "Z's Diet Center" as the designated highest bidder instead of "X Gym."

The system and method may charge the seller or buyer a fee for each transfer of highest bidder status. By way of example, if the payment for the sale is transacted via server 110, server 110 may deduct a percentage of the sale price as a commission prior to crediting the account of the seller.

Many if not most users will purchase the highest-bidder status in order to increase the likelihood of their own advertisements being displayed (hereafter, "genuine advertisers").

However, if the system and method permits users to sell their highest-bidder status to other users, some purchasers of highest-bidder status may have no interest in having their advertisements displayed; rather, their sole interest for the purchase may be based on the speculative likelihood that they can resell the highest-bidder status to other users at a profit (hereafter, "speculators"). Such speculators may tend to increase the price that a genuine advertiser must pay to become the highest bidder and, accordingly, certain aspects of the system and method may consider speculators to be undesirable. This is particularly so if the system and method permits the sale of unexercised highest-bidder options, because the value of many options will tend to increase as the relevant dates approach. As the dates get closer, many users will tend to obtain more information to judge whether the option's PPC is too high. Accordingly, the risk of exercising the option may tend to decrease over time, and this decreased risk may result in options tending to increase in resale value over time.

The system and method as described above may automatically tend to mitigate the impact of speculators. An advertisement is not selected solely on the PPC; the advertisement may be selected based on facts that are unrelated to the PPC such as the popularity of the landing page. Therefore, even if a speculator is considered to be paying the highest PPC, the speculator's advertisements are unlikely to be selected over a genuine advertisement. Therefore, this decreases the likelihood of a genuine advertiser wanting to purchase a highest bidder status from a speculator.

Even so, the system and method advantageously provides the ability to include additional mechanisms to decrease the impact of speculators. In that regard, the advertisement may also be selected based on the likelihood that the designated highest bidder is a speculator.

In one aspect of the system and method, if the server has awarded the highest-bidder status (as an option or otherwise) to one user for a large number of different keywords for future time periods, this may be considered to be indicative of the likelihood of the user being a speculator. By way of example only, if a user purchases the highest-bidder status for hundreds of different keywords, this may indicate that the user is more interested in selling the highest-bidder status than using it. Accordingly, the system and method may limit the total number of highest-bidder awards held by a user.

In addition or alternatively, the system and method may include the user's number of highest-bidder awards as a weighted parameter in the ranking function. For example, processor 120 of server 110 may calculate a value related to the number of awards according to following function or variants thereof:

SpeculatorMultiplier=
{1.00, where 0<total awards<=20;
{(500−total awards)/500, where 20<total awards<=500; or
{0.00, where 501<total awards.

Figure 18:
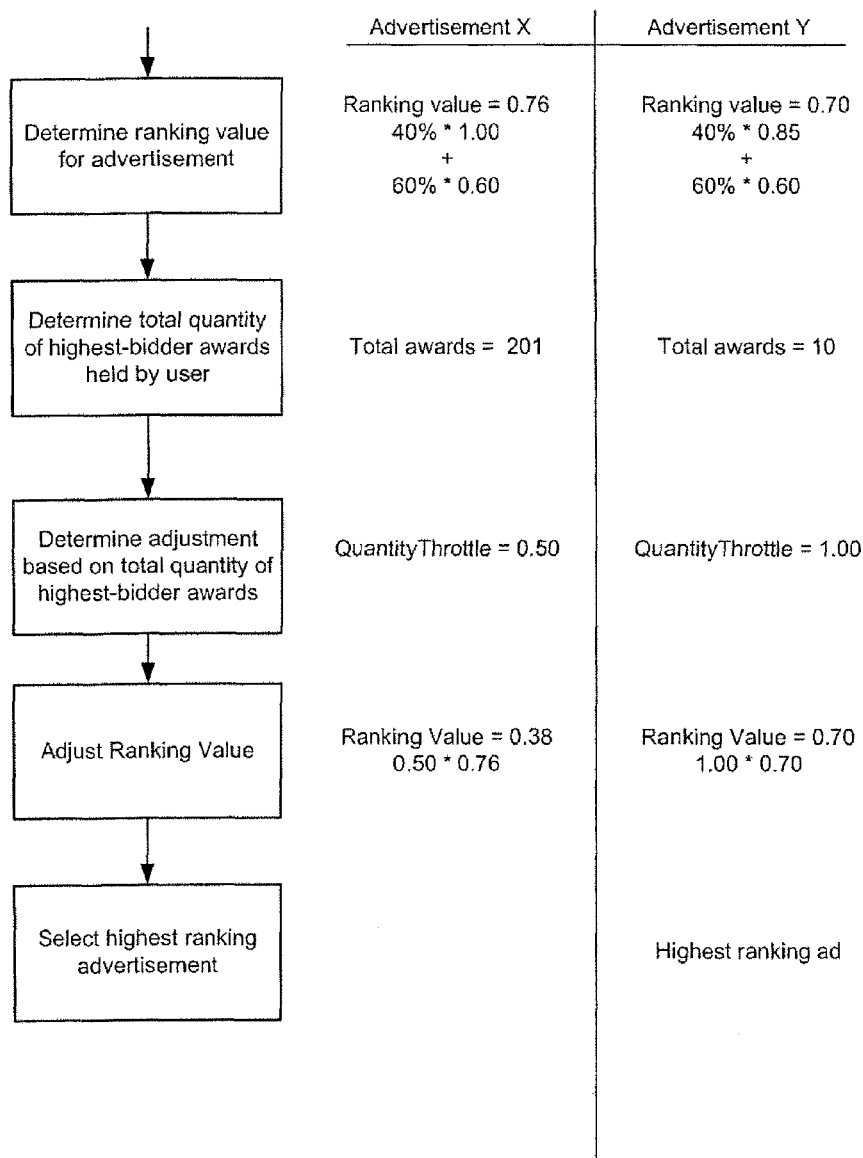
FIG. 18 is a flow chart and a diagram of sample data in accordance with an aspect of the invention.

The foregoing function may be applied as shown in FIG. 18, which is a variant of the process described in FIG. 9. The popularity of the landing sites of Advertisement X and Advertisement Y are assumed to be equal and Advertisement X is assumed to be associated with the designated highest bidder. Absent other factors, the ranking value will thus favor Advertisement X (e.g., 0.76 versus 0.70).

However, the processor may also determine that the user associated with Advertisement X is the highest-bidder on 249 other keywords. If this is potentially indicative of the user being a speculator, the ranking value attributed to the Advertisement X may be negatively impacted. For example, the SpeculatorMultiplier value for Advertisement X will equal 0.50 based on the foregoing function (i.e., (500-250 awards)/500). This may be multiplied against Advertisement X's ranking value, decreasing it from 0.76 to 0.38. As a result, Advertisement Y will be ranked higher and displayed to the user.

In another aspect, advertisements are ranked not only on the likelihood of the current highest bidder being a speculator, but also based on whether the current highest bidder purchased its status directly or indirectly from a user that is likely to be a speculator.

Continuing the foregoing example, the system and method may have prevented a genuine advertiser from having its advertisement blocked by a speculator. However, it may also be desirable to discourage speculators from purchasing highest bidder status in the first place by making their sale of the highest-bidder status less valuable than sales by genuine advertisers.

Figure 19:
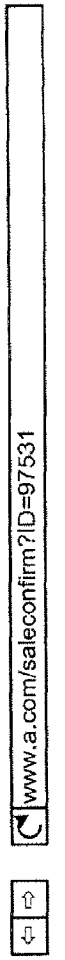
FIG. 19 is a screen shot relating to confirming purchase of highest-bidder status and effect of prior seller status in accordance with an aspect of the invention.

In that regard, the speculator value may be determined for each prior holder of the highest-bidder status and then applied to the current holder. As shown in FIG. 19, before a user can consummate a user-to-user sale of highest-bidder status, the system and method may present a webpage 1910 to the prospective purchaser and ask the purchaser to confirm that they are interested in the sale. The page may identify the information 1920 particular to the award and the price 1930 that the buyer will pay the seller for transferring the highest-bidder status.

The confirmation 1910 sent to the buyer may further contain a warning 1940 if the ranking of any advertisements based on the keyword are likely to be negatively impacted by the likelihood that the seller is a speculator. If the buyer confirms the purchase anyway, such as by selecting button 1950, the sale will continue. However, even if the buyer holds relatively few highest-bidder awards (e.g., SpeculatorMultiplier=1.00), the seller's high volume of highest-bidder awards may still be applied against the buyer (e.g., buyer's advertisement may be multiplied by the seller's Speculator-Multiplier value of 0.60).

The system and method may further draw distinctions between highest bidder awards based on exercised versus unexercised options. For example, speculators are less likely to commit to paying the PPC than a genuine advertiser. Accordingly, when determining the total number of awards held by a user, the system and method may exclude exercised options from the total or weigh them less than unexercised options.

The system and method is not limited to any particular function for determining a speculator-based parameter of the ranking function. For example, the function used to calculate a ranking value may also accept the following parameters in addition to PPC price and quality:

(1) the percentage of highest-bidder options exercised by the user;

(2) whether the network node used to purchase highest-bidder status has been previously associated with undesirable activity;

(3) whether the advertisement's landing site has been previously associated with undesirable activity;

(4) the prominence and reputation of the user (e.g., the number of highest bidder awards that are considered suspicious may differ from user to user, such that prominent and reputable users are allotted more awards than unknown users); and (5) the diversity of the keywords of which the user is the highest bidder.

Another one of the advantages of the system and method is its ability to accommodate a wide variety of features that may be used in combination with or alternatively to the foregoing features.

For instance, the specific equations provided above are examples only, and may be replaced with different parameters, operations and complexity.

Instead of paying to be the highest bidder, the system and method may also allow users to be considered as belonging to a particular tier of advertisements. For example, by paying a fee, an advertiser may be considered to be among the top three matching advertisements as far as PPC prices are concerned, the top 5% of PPC prices, no less than the average PPC of advertisements considered to be very interesting to users, etc. In that regard, even if the system and method restricted the highest bidder designation to a single user for any given keyword at any given point in time, it may permit multiple users to pay for the right to be considered among the top or average advertisers.

The system and method may provide advertisers with various mechanisms to designate advertisements as being accorded highest-bidder status. In one aspect, the designation may be specific to all of the values of a particular advertisement wherein the highest-bidder status is associated with not only a designated time range and keyword, but also designated content, advertiser, landing page, etc. In another aspect, the designation may also automatically applied to any advertisement associated with a particular advertiser. Other aspects may designate combinations of some or all of the foregoing.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only one of many possible embodiments.

The invention claimed is:

1. A method of displaying information to users comprising:
receiving, via a network, a bid from each bidder among a plurality of bidders, where a bid comprises content to be displayed to a user, a price to be paid by the bidder when the content is accepted by a user, and a search term;
designating a bid among the plurality of the bids;
receiving, via a network, a request for information from a user and a search term;
selecting, with a processor, a bid based on a comparison of the request's search term with the bid's search term, and further based on a quality component and a price component, wherein the quality component is based on an estimate of the user's interest in the bid's content, wherein the price component of the bids that are not designated is based on the bid's price, and wherein the price component of the designated bid is based on the highest price associated with the plurality of bids; and
displaying, on an electronic display, the selected bid's content to a user.

2. The method of claim 1 wherein the bidders are advertisers and the content comprises an advertisement.

3. The method of claim 1 wherein the price to be paid by the bidder comprises a price to be paid when the content is displayed to the user.

4. The method of claim 1 wherein the price to be paid by the bidder comprises a price to be paid when the content is selected by the user.

5. The method of claim 1 wherein the bid is designated by a processor in response to receiving a request by a bidder for the designation.

6. The method of claim 1 wherein the bidder associated with the designated bid pays an amount for the designation in addition to the price paid by the bidder when the content is accepted by a user.

7. The method of claim 6 further comprising determining, with a processor, the amount to be paid for the designation, displaying the amount to a bidder, and receiving a bidder's acceptance of the amount.

8. The method of claim 1 wherein designating a bid further comprises receiving a time range associated with the designated bid, wherein the method further comprises determining the time of the request for information from a user, and wherein the price component of the designated bid is based on the highest price associated with the plurality of bids when the time of the request is within the designated bid's associated time range.

9. The method of claim 1 wherein each bid is associated with the location of a web page, and wherein the estimate of the user's interest in the bid's content is based on the popularity of the website.

10. The method of claim 1 wherein selecting the bid comprises determining, with a processor, a ranking value for each bid and selecting the bid with the highest ranking value, the ranking value being based on a ranking function accepting the following parameters: a comparison of the request's search term with the bid's search term, the quality component, and the price component.

11. A method of displaying information to users comprising:
receiving, from a first user, an identification of a first keyword/period pair, where a keyword/period pair comprises an association between a search term and a time range;
receiving, from the first user, first content associated with the search term of the first keyword/period pair and a first price to be paid if the content is selected by another user when displayed to the user;
receiving, from a second user, an identification of a second keyword/period pair, where the search term of the second keyword/period pair corresponds with the search term of the first keyword/period pair, and where the time range of the second keyword/period pair overlaps with the time range of the first keyword/period pair;
receiving, from the second user, second content associated with the search term of the second keyword/period pair and a second price to be paid if the content is selected by another user when displayed to the user;
receiving from a third user, a request for information, the request being associated with the search term of the first keyword/period pair and the request occurring during said overlap;
determining, with a processor, a first ranking value for the first content based on (a) information associated with the first content other than the first and second price, (b) the first price when the first price is higher than the second price, and (c) another price higher than the second price when the second price is higher than the first price;

determining, with a processor, a second ranking value for the second content based on (a) information associated with the second content other than the first and second price and (b) the second price;

selecting, with a processor, the first content if the first ranking value is higher than the second ranking value;

selecting, with a processor, the second content if the second ranking value is higher than the first ranking value; and displaying the selected content to the third user.

12. The method of claim 11 further comprising charging the first user the first price when the third user selects the first content after it is displayed, and charging the second user the second price when the third user selects the second content after it is displayed.

13. The method of claim 11 further comprising displaying a plurality of keyword/period pairs to the first user and wherein the first keyword/period pair comprises a keyword/period pair selected by the first user among the plurality.

14. The method of claim 11 wherein the information associated with the content other than the price comprises information indicative of the likelihood that the third user will select the content.

15. A method comprising:
receiving a plurality of advertisements associated with a search term and a selection price for each advertisement where the selection price is paid after the advertisement is provided to a user;
associating an advertisement with a designated time range and an additional payment;
receiving a query from a user that includes the search term;
determining, with a processor and for each advertisement, a priority value based on a priority function whereby the function returns (a) when the selection prices of the advertisements are equal and the query is received at a time outside of the designated time range, the advertisement with the greatest estimated likelihood of being selected by the user, (b) when the advertisements have an equal estimated likelihood of being selected by the user and the query is received outside of the designated time range, the advertisement with the highest selection price and (c) when the advertisements have an equal estimated likelihood of being selected by the user and the query is received at a time within the designated time range, the advertisement associated with the additional payment; and
providing the advertisement with the highest priority value to the user.

16. The method of claim 15 wherein the advertiser associated with the provided advertisement is charged the selection price.

17. The method of claim 16 further comprising receiving a request that the option be associated with a third user, and wherein the option is applicable when third user exercised the option, the query was received during the designated time range, and one of the advertisements is associated with the third user.

18. The method of claim 17 further comprising receiving a confirmation from the first and third user that the option is to be associated with a third user.

19. The method of claim 17 further comprising determining whether the request meets acceptance criteria.

20. The method of claim 19 wherein the acceptance criteria comprises determining the quantity of other options for other search terms that are associated with the third user.

21. The method of claim 17 further comprising receiving the identification of a fee associated with the request that the option be associated with a third user.

22. The method of claim 21 further comprising receiving a payment based on the fee.

23. The method of claim 15 wherein associating an advertisement with a designated time range comprises receiving an indication from an advertiser that the advertiser will pay an option fee based on the designated time range, and wherein the option fee is associated with the advertisement's search term.

24. The method of claim 15 wherein the selection price is paid when the advertisement is selected by a user after being displayed to the user.

25. A method comprising:
receiving a set of advertisements associated with a search term and a selection price for each advertisement where the selection price is paid when the advertisement is accepted by a user;
receiving an identification of an option from a first user, where an option is associated with the search term and a designated time range;
receiving a query from a second user that includes the search term;
determining, with a processor and for each advertisement, a priority value based on a priority function such that (a) the priority value increases with increasing estimated likelihood that the advertisement will be selected by the second user, and (b) the priority value of an advertisement associated with the first user is greater than another advertisement when the option is applicable and such estimated likelihood of the two advertisements are the same; and
displaying the advertisement with the highest priority value more prominently than the other advertisements among the set of advertisements;
wherein the option is applicable when the first user exercised the option, the query was received during the designated time range, and one of the advertisements is associated with the first user.

26. The method of claim 25 wherein the option is not applicable unless the option was exercised before the designated time range.

27. The method of claim 25 wherein the option is not applicable unless the option fee was charged prior to the designated time range.

28. A method comprising:
receiving a plurality of advertisements, each advertisement being associated with a user, a search term and a selection price where the selection price is paid when the advertisement is displayed to and selected by a user;
receiving a highest-bidder designation, where a highest-bidder designation associates a user with a search term;
receiving, from a requesting user, a request for information related to a search term;
identifying, with a processor, a plurality of advertisements based on the search term of the request;
designating, with a processor, an advertisement as the highest-bidder advertisement when the advertisement's search term and advertisement's user corresponds with the highest-bidder designation's associated search term and user;
determining, with a processor, a ranking value for each identified advertisement, the ranking value of each advertisement being based on the following components: (a) the estimated likelihood that the advertisement will be selected by the requesting user, (b) the selection price of the advertisement unless the advertisement is designated as the highest-bidder advertisement, (c) the selection price of the identified advertisement with the highest selection price, if the advertisement is designated as the highest-bidder advertisement, and (d) the number of highest-bidder designations associated with the advertisement's associated user; and displaying the identified advertisement with the highest ranking value more prominently than the other identified advertisements.

29. The method of claim 28 wherein the ranking value of an advertisement decreases with the increasing number of highest-bidder designations associated with the advertisement's associated user.

30. The method of claim 28 wherein the ranking value of an advertisement decreases when the number of highest-bidder designations associated with the advertisement's associated user exceeds a threshold.

31. A method comprising:
providing, via a network, a plurality of bids where a bid comprises content to be displayed to a user, a price to be paid when the content is accepted by a user, and a search term;
providing a designation of a bid;
receiving an indication of payments to be made, the payment being based on the price and the display of a provided bid's content to users, wherein content was selected for display by a processor, and
displaying the indication on an electronic display;
wherein the processor selected the content based on a comparison of the provided bids' content and price relative to the content and price of other bids that were associated from other users and associated with the same search term, where the processor used a provided bid's price for comparison if the provided bid was not designated, and where the processor uses the highest price of the other bids as the provided bid's price if the provided bid was designated.

32. The method of claim 31 further comprising displaying a fee paid for the designation of the bid.

33. The method of claim 31 wherein providing a designation of a bid comprises providing a designation of a search term and the identity of the entity providing the designation.

34. The method of claim 33 further comprising identifying another user, wherein said another user's bid is designated.

35. The method of claim 31 further comprising a price to be received in response to identifying said another user.

36. A system comprising:
a processor;
instructions operable by the processor;
a user input device for providing data to the processor;
a display displaying data processed by the processor in accordance with the instructions;
a medium storing the instructions; and
an electronic memory storing data accessed by the processor;
the instructions comprising:
receiving, via a network, a bid from each bidder among a plurality of bidders, where a bid comprises content to be displayed to a user, a price to be paid by the bidder when the content is accepted by a user, and a search term;
designating a bid among the plurality of the bids;
receiving, via a network, a request for information from a user, and a search term;
selecting, with a processor, a bid based on a comparison of the request's search term with the bid's search term, and further based on a quality component and a price component, wherein the quality component is based on an estimate of the user's interest in the bid's content, wherein the price component of the bids that are not designated is based on the bid's price, and wherein the price component of the designated bid is based on the highest price associated with the plurality of bids; and
providing, over the network, the selected bid content to a user.

37. The system of claim 36 wherein the instructions further comprise providing other bids associated with the search term with instructions to display the other bids less prominently than the selected bid.

38. The system of claim 36 wherein the system is a web server and the selected bid content is provided for display in a browser.

39. The system of claim 36 wherein the price to be paid by the bidder comprises a price to be paid when the content is displayed to the user.

40. The system of claim 36 wherein the price to be paid by the bidder comprises a price to be paid when the content is selected by the user.

41. The system of claim 36 wherein the instructions further comprise determining, with a processor, the amount to be paid for the designation, displaying the amount to a bidder, and receiving an bidder's acceptance of the amount.

42. The system of claim 36 wherein designating a bid further comprises receiving a time range associated with the designated bid, wherein the instructions further comprise determining the time of the request for information from a user, and wherein the price component of the designated bid is based on the highest price associated with the plurality of bids when the time of the request is within the designated bid's associated time range.

43. A system comprising:
a first computer at a first node of a network;
the first computer having access to instructions operable by the first computer, a set of advertisements and likelihood data related to the likelihood of a user being interested in the advertisements, each advertisement being associated with a search term and a price to be paid after the advertisement is provided to a user, and each advertisement being further associated with an advertiser;
a client device at a second node of the network different from the first node, the client device comprising a user input device, an electronic display, a processor and instructions operable by the processor;
the instructions of the first computer comprising:
receiving a designation of an advertiser and a time range;
receiving a query from a user that includes a search term;
identifying a plurality of advertisements associated with the query's search term;
determining whether an advertisement is a highest-bidder advertisement, where an advertisement is a highest-bidder advertisement when it associated with the designated advertiser and the query is received during the designated time frame;
determining, for each identified advertisement, a ranking value based on (a) the likelihood data, (b) the price of the advertisement when the advertisement is not a highest-bidder advertisement, and (c) the highest price associated with the other identified advertisements when the advertisement is the highest-bidder advertisement; and
providing an advertisement to the client device based on the ranking value;
the instructions of the client device comprising:
transmitting the query to the first computer; and displaying, on the electronic display, the advertisement provided by the first computer.

44. The system of claim 43 wherein the advertisement is provided on a web page, and wherein the position of the advertisement on the page is based on the ranking value.

45. The system of claim 43 wherein a plurality of advertisements are provided to the client device and the position of the advertisements relative to the electronic display is based on the ranking value.

46. The system of claim 43 wherein the first computer is a web server.

47. The system of claim 43 wherein the client device is a personal computer.

48. A computer-usable medium including a program executable by a processor comprising:

computer code that receives, via a network, a bid from each bidder among a plurality of bidders, where a bid comprises content to be displayed to a user, a price to be paid by the bidder when the content is accepted by a user, and a search term;

computer code that designates a bid among the plurality of the bids;

computer code that receives, via a network, a request for information from a user and a search term;

computer code that selects, with a processor, a bid based on a comparison of the request's search term with the bid's search term, and further based on a quality component and a price component, wherein the quality component is based on an estimate of the user's interest in the bid's content, wherein the price component of the bids that are not designated is based on the bid's price, and wherein the price component of the designated bid is based on the highest price associated with the plurality of bids; and computer code that displays, on an electronic display, the selected bid's content to a user.

* * * * *